UNITED STATES PATENT OFFICE.

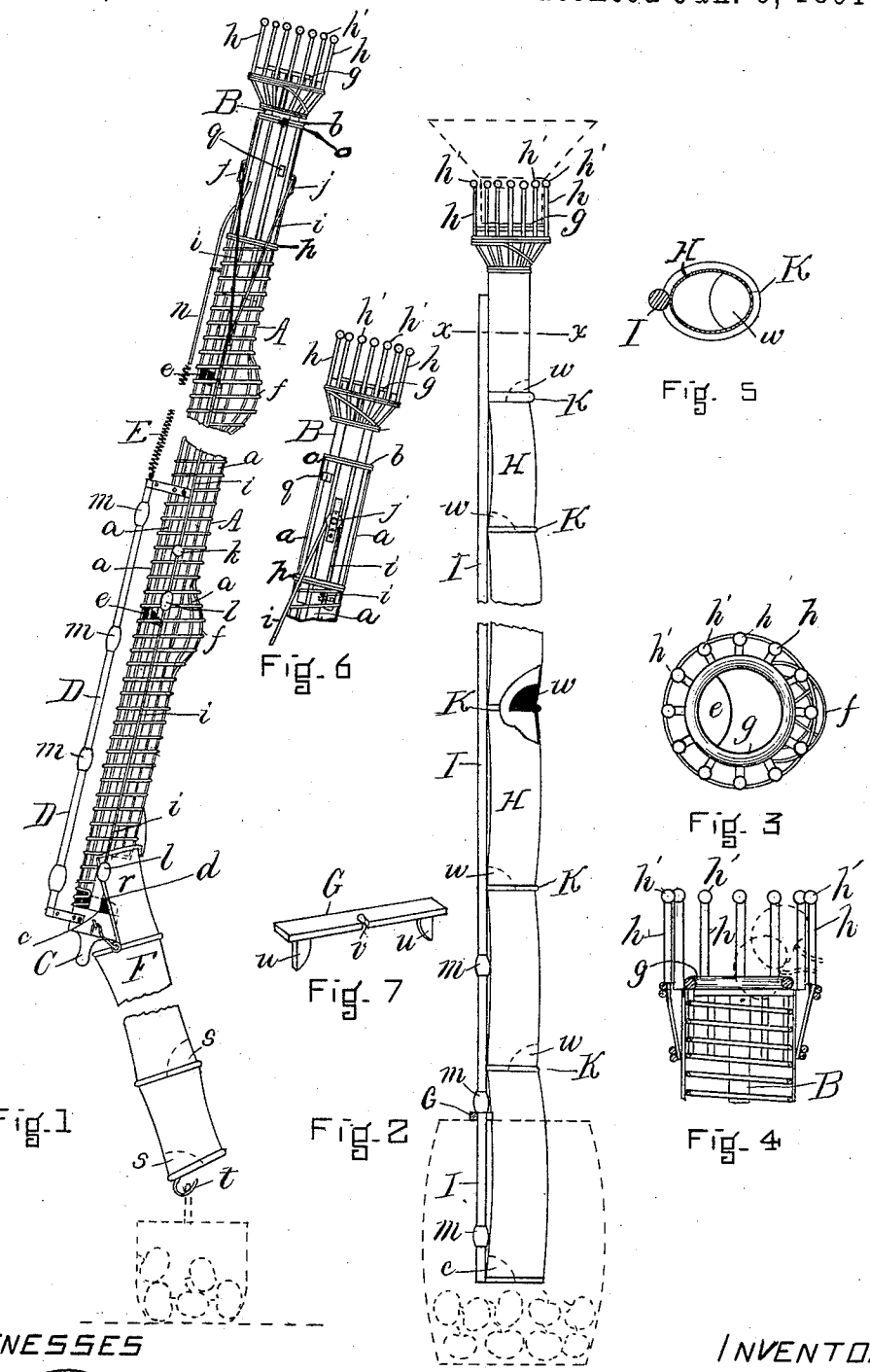

CHARLES R. BANKS, OF BOSTON, MASSACHUSETTS.

FRUIT-GATHERER.

SPECIFICATION forming part of Letters Patent No. 444,037, dated January 6, 1891.

Application filed March 31, 1890. Serial No. 346,097. (No model.)

*To all whom it may concern:*

Be it known that I, CHARLES R. BANKS, of Boston, in the county of Suffolk and State of Massachusetts, have invented certain new and useful Improvements in Fruit Pickers and Gatherers; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention relates to fruit pickers and gatherers; and my improvements consist in a long tube or chute having an open top for the admission of the fruit, cushions inserted at intervals in said tube and extending part way across the same for breaking the fall of the fruit in its descent and preventing it from becoming bruised, and an opening at or near the bottom of the tube for the exit of the fruit from the same.

My improvements also consist in a picking apparatus to be attached to the upper open end of a tube or chute consisting of an annular cushion or ring, and a series of fingers surrounding said ring and extending outward beyond the same, the combination of the fingers and ring serving to readily break the fruit from its stem and prevent the former from being bruised and the limb from being strained.

My improvements also consist in certain other features and details of construction, all as more particularly hereinafter described.

In the accompanying drawings, Figure 1 shows in elevation one form of my improved fruit picker and gatherer and one mode of using the same. Fig. 2 shows another form of my picker and gatherer and another mode of using the same. Fig. 3 is an end view of the fruit-picker or upper end of the apparatus. Fig. 4 is a detail enlarged, showing the manner in which the fruit is picked. Fig. 5 is a cross-section through the line $x\,x$ of Fig. 2. Figs. 6 and 7 are details of the constructions shown in Figs. 1 and 2.

Referring to Fig. 1, A is a tube constructed of some light material and provided with longitudinal stays or braces $a$ to hold it in its straight longitudinal and open position. I have shown the tube A in said figure as made of rattan or wicker work wrapped spirally around the longitudinal braces $a$. The tube A should be of large enough diameter for the fruit to readily drop through it, and said tube is open at its top $b$ for the admission of the fruit, and is provided at its bottom with a cushion $c$ and an opening $d$ in its side adjacent to the cushion $c$ for the exit of the fruit from the tube. The tube A is also provided at intervals along its length with small cushions $e$, which are inserted in the tube and extend transversely part way across its diameter, and $f$ are enlargements or swells of the tube A opposite the cushions $e$, the object of said cushions being to break the fall of the fruit in its descent through the tube A, and the swells $f$ being for the purpose of giving room for the fruit to pass the cushions.

B is a short rigid tube inserted in the upper end $b$ of the tube A and having its upper opening surrounded by an annular ring or cushion $g$, and said cushion is surrounded, a short distance outside of the same, by a series of elastic cushioned fingers or projections $h$. These fingers may be made of reeds or rattan, and covered or partly covered with rubber or other elastic material, having an enlarged rounded end $h'$, as shown in the drawings.

The tube B is adapted to slide in or over the tube A, and to be operated from its lower end. A very simple contrivance for accomplishing the same is a cord $i$, which is secured to the lower portion of the tube B, and passing up over pulleys $j$, which are secured to the outside of the tube A, and thence down to the lower end of the same through guides $k$. To the lower portion of the cord $i$ knobs or handles $l$ are secured at convenient intervals to form handles for pulling down the cord; but these are unimportant and may be omitted, if desired.

C is a handle secured to the bottom of the tube A, and D is a handle-rod extending up one side of said tube and parallel with the same, and provided with knobs $m$, similar to $l$, to assist in holding up the apparatus.

E is a coil-spring, attached at one end to the handle D or to the tube A and at the other end to a cord $n$, connecting said spring with the tube B. Said spring tends constantly to pull down the tube B in the tube A, and the pulling down of the cord $i$ operates to draw up the tube B against the action of the spring $m$, and when said cord is released the spring $m$ will return the tube B to its former position. The upper portion of the tube A has an annular coil of rattan $o$, or reeds, at its end, and for a short distance below said coil the tube A is constructed only of the longitudinal slats, the lower extremity of the uncoiled portion terminating in an annular coil $p$, similar to $o$. A projection $q$ on the tube B extends out beyond the same and between the coils $o$ and $p$, and serves to limit the longitudinal play of the tube B in the tube A by striking against said coils. The uncovered portion of the tube A also serves to give the cords $i$ and $n$ plenty of freedom of action.

F is a flexible tube open at each end, the upper end $r$ of which is adapted to be removably attached to the lower portion of the tube A, so that the outlet $d$ will open into the tube F. Said tube is preferably elliptical in cross-section, and is provided at intervals with cushions $s$, similar to the cushions $e$ in the tube A, and for a similar purpose. I prefer the elliptical form for the tube F, in order to give the fruit room enough to drop beyond the cushions $s$, and I also prefer to place these cushions alternately on opposite sides of the tube, as shown in Fig. 1, so that the fall of the fruit may be the better broken in its passage through the tube F.

Secured to the lower end of the tube F is a hook $t$, by which said tube can be attached to the handle of a basket or other receptacle. If it be desired to fill a receptacle with fruit, the hook $t$ is attached to the receptacle, as shown in Fig. 1. The operator then lifts up the apparatus by one of the handles C or D until the ring or annular cushion $g$ is under the fruit. Then he pulls the cord $i$ and raises the tube B until the stem of the fruit is between two of the cushioned fingers $h$, (see Fig. 4,) and the further raising of the tube B will roll the fruit over the cushion $g$ against the inner surfaces of the fingers $h$, (see dotted lines,) and break the fruit from the branch without straining or injuring either it or the fruit. The latter will then roll down the tubes B, A, and E, with its fall being broken every little way until it reaches the receptacle. It is a most important feature of my invention that the stem is not cut nor is the fruit pulled down, which latter action is apt to injure the branch. As the gravity of the hanging fruit being a constant pressure on the stem, the upper surface of the same, which bears the greatest strain, is the stronger and tougher, while it is a well-known fact that the under part of the stem, on which there is comparatively little strain, is the weaker, and that fruit is the most easily picked by rolling and pulling it upward. This latter action is what the fruit gets when being picked by my apparatus, as it lifts and rolls the fruit over the cushioned ring $g$ (see Fig. 4) until it is easily and with no strain to the fruit or branch severed from the same.

If it be desired to pick the fruit from the tree by hand, a funnel, as shown in dotted lines in Fig. 2, should be inserted within the fingers $h$ to catch the fruit and guide it down to the tube A. In this case the apparatus will of course have to be supported by another person or by some mechanism.

I have shown in Fig. 2 a simple and very effective manner of attaching the tube A to a barrel so that the latter may be filled by a person in the tree. G is a bar of wood or of other similar material having two parallel extensions $u$ extending downward from the same near each of its ends, and a slot or recess $v$ extending inward from the edge of the bar. By extending the bar across the open top of a barrel with the extensions $u$ bearing against the inner walls of the same, and inserting the handle D in the slot or recess $v$, the apparatus can be supported on the bar F by means of any of the knobs $m$ resting upon the same above the socket $v$. When the barrel is nearly empty, the bottom of the tube A should be near the bottom of the barrel in order to give the fruit only a short distance to fall from the tube, and thus prevent its being bruised, and as the barrel fills up with the fruit the chute A can be adjusted upon its support with its lower end farther away from the bottom of the barrel. If a receptacle is to be filled in the above manner, it will be seen that the lower tube F will not be needed.

I have shown in Fig. 2 another form of my invention. In this case the main tube or chute H, which takes the place of the tube A in Fig. 1, is of flexible material except for a short distance at the top, this portion being rigid to allow it to rest against the branches of the tree without caving in. The tube H is also elliptical in cross-section, and has its cushions $w$ alternately arranged, like the tube F in Fig. 1. The tube H is also stretched and attached longitudinally to a pole I, and said tube is given and held in its elliptical form by means of elliptical rings K surrounding and attached to the tube H at intervals. I prefer, also, to attach the cushions $w$ to the tube H and to the rings K in order to give said rings a more firm support and to keep them in their transverse position in said tube. I also prefer to attach the tube H to the pole I by the rings K to give said tube a more secure and rigid support. The tube H being of flexible material and quite light, it is not necessary to have a secondary sliding tube at the top. The entire apparatus can be lifted to pick the fruit, and in this case the annular cushioned ring $g$ and fingers $h$ are secured to or form part of the upper rigid end of the tube H.

The pole I constitutes the handle of the apparatus, and it may be extended below the tube H as far as desired.

When the construction shown in Fig. 2 is used, the entire apparatus is lifted by the handle, with the ring $g$ under the fruit, until it is picked in the manner above described. The tube F can be applied to the bottom of the tube H, whenever desired, by any appropriate fastening device.

I do not limit myself to any particular material or materials in the construction of my improved fruit picker and gatherer, as many different kinds of light material may be used for the purpose.

What I claim as new, and desire to secure by Letters Patent, is—

1. A fruit picker and gatherer consisting of a conducting tube or chute having cushions secured to the interior of the same at intervals along its length, and an opening at or near its lower end, in combination with an annular cushion secured to the upper end of the conducting-tube and surrounding the opening of the same, and a series of longitudinally-projecting fingers surrounding said cushion a short distance outside of the same, all substantially as shown, and for the purposes set forth.

2. In combination with a conducting-tube, the annular cushioned ring $g$, surrounding the opening of the upper end of said tube, and a series of longitudinal cushioned fingers surrounding said ring a short distance outside of the same and extending beyond the ring, substantially as shown, and for the purposes set forth.

3. A fruit picker and gatherer having a conducting tube or chute formed of two sections, the upper one of which is adapted to slide in or on the lower one, in combination with means for sliding said section, and an annular cushion or ring surrounding the opening of the end of the upper section, and a series of longitudinally-projecting fingers surrounding said ring a short distance outside of the same, all substantially as shown, and for the purposes set forth.

4. A fruit picker and gatherer having a conducting tube or chute formed of two sections, the lower one of which has cushions secured to the interior of the same at intervals along its length, the upper section of which is adapted to slide in or on the lower section, in combination with means for sliding said upper section, and an annular cushion surrounding the opening of the upper open end of the same, and a series of longitudinally-projecting fingers surrounding said ring a short distance outside of the same, all substantially as shown, and for the purposes set forth.

5. A fruit picker and gatherer consisting of a conducting tube or chute having cushions secured to the interior of the same at intervals along its length and an opening at or near its lower end, in combination with an annular cushion secured to the upper end of the conducting-tube and surrounding the opening of the same, a series of longitudinally-projecting fingers surrounding said cushion a short distance outside of the same, and a handle for holding up said tube, all substantially as shown, and for the purposes set forth.

6. A fruit picker and gatherer having a conducting tube or chute formed of two sections, the lower one of which has cushions secured to the interior of the same at intervals along its length, the upper section of which is adapted to slide in or on the lower section, in combination with the cord $i$ and pulleys $j$, an annular cushion surrounding the upper open end of the upper section, and a series of longitudinal projecting fingers surrounding said cushion, all substantially as shown, and for the purposes set forth.

7. In combination with the fruit-conducting tube, the handles having the swells or projections $m$, the bar G, having the recess $v$ and extensions $u$, all substantially as shown, and for the purposes set forth.

CHARLES R. BANKS.

Witnesses:
PENNINGTON HALSTED,
CHARLES E. MOSS.